US012012863B2

(12) United States Patent
Miyabe

(10) Patent No.: US 12,012,863 B2
(45) Date of Patent: Jun. 18, 2024

(54) MAINTENANCE METHOD FOR STEAM TURBINE AND STEAM TURBINE

(71) Applicant: MITSUBISHI HEAVY INDUSTRIES, LTD., Tokyo (JP)

(72) Inventor: Tsuyoshi Miyabe, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/914,985

(22) PCT Filed: May 20, 2021

(86) PCT No.: PCT/JP2021/019239
§ 371 (c)(1),
(2) Date: Sep. 27, 2022

(87) PCT Pub. No.: WO2021/241408
PCT Pub. Date: Dec. 2, 2021

(65) Prior Publication Data
US 2023/0105351 A1 Apr. 6, 2023

(30) Foreign Application Priority Data
May 28, 2020 (JP) ................................ 2020-093637

(51) Int. Cl.
*F01D 25/28* (2006.01)
*F01D 25/16* (2006.01)

(52) U.S. Cl.
CPC ......... *F01D 25/285* (2013.01); *F01D 25/162* (2013.01); *F05D 2220/31* (2013.01); *F05D 2230/72* (2013.01)

(58) Field of Classification Search
CPC ...... F01D 25/285; F01D 25/162; F01D 5/005; F01D 25/16; F01D 25/28; F05D 2220/31;
(Continued)

(56) References Cited

U.S. PATENT DOCUMENTS 3,764,098 A * 10/1973 Dickinson ................ F16M 7/00 248/638
5,331,243 A 7/1994 Halbohm
(Continued)

FOREIGN PATENT DOCUMENTS

EP 3 009 617 4/2016
JP 53-51349 5/1978
(Continued)

OTHER PUBLICATIONS

International Search Report issued Jul. 20, 2021 in International Application No. PCT/JP2021/019239, with English language translation.

(Continued)

*Primary Examiner* — Lawrence Averick
(74) *Attorney, Agent, or Firm* — Wenderoth, Lind & Ponack, L.L.P.

(57) ABSTRACT

A maintenance method for a steam turbine including a rotor, a casing for accommodating the rotor, and a bearing box for accommodating a bearing which supports the rotor includes: a step of installing an expansion-and-contraction member below the rotor by using an upward facing flat surface disposed between the casing and the bearing box in an axial direction; and a step of pushing up the rotor upward by the expansion-and-contraction member.

13 Claims, 7 Drawing Sheets

(58) Field of Classification Search
CPC ............. F05D 2230/72; F05D 2230/80; F05D 2260/37
See application file for complete search history.

(56) References Cited

U.S. PATENT DOCUMENTS

| | | | | |
|---|---|---|---|---|
| 6,279,309 | B1 * | 8/2001 | Lawlor | F01D 25/285 60/39.35 |
| 6,793,458 | B2 * | 9/2004 | Kawai | F01D 25/28 415/213.1 |
| 9,790,066 | B2 * | 10/2017 | Yamasue | F01D 25/285 |
| 10,344,625 | B2 | 7/2019 | Oden et al. | |
| 2014/0053394 | A1 | 2/2014 | Cooper et al. | |
| 2016/0052756 | A1 * | 2/2016 | Yamasue | F16C 41/04 254/93 R |
| 2017/0241289 | A1 | 8/2017 | Hidaka et al. | |
| 2020/0011205 | A1 | 1/2020 | Sasaki et al. | |
| 2023/0027901 | A1 * | 1/2023 | Muramatsu | H02K 15/00 |

FOREIGN PATENT DOCUMENTS

| | | |
|---|---|---|
| JP | 58/7800 | 9/1983 |
| JP | 63-88207 | 4/1988 |
| JP | 2010-121499 | 6/2010 |
| JP | 2012-62872 | 3/2012 |
| JP | 2014-43857 | 3/2014 |
| JP | 2014-240645 | 12/2014 |
| JP | 2020-7956 | 1/2020 |
| KR | 10-2111583 | 5/2020 |
| WO | 2016/079822 | 5/2016 |

OTHER PUBLICATIONS

International Preliminary Report on Patentability issued Dec. 8, 2022 in International Application No. PCT/JP2021/019239, with English language translation.

* cited by examiner

MAINTENANCE METHOD FOR STEAM TURBINE AND STEAM TURBINE

TECHNICAL FIELD

The present disclosure relates to a maintenance method for a steam turbine and a steam turbine.

The present application claims priority based on Japanese Patent Application No. 2020-093637 filed on May 28, 2020, the entire content of which is incorporated herein by reference.

BACKGROUND ART

In maintenance of a steam turbine, a rotor may be lifted to remove internal components (e.g., bearing) from a casing in which the rotor is housed, and an expansion member such as a hydraulic jack may be used for this purpose.

Patent Document 1 does not relate to maintenance, but Patent Document 1 describes assisting the lifting of a turbine rotor with a jack installed inside a bearing box when starting a turbine.

CITATION LIST

Patent Literature

Patent Document 1: JP2012-62872A

SUMMARY

Problems to be Solved

In recent years, in order to reduce the cost and improve the performance of a steam turbine, the axial length of the turbine tends to be shortened, and in line with this, a bearing box for accommodating a bearing which supports the turbine rotor also tends to be shortened in the axial direction. As a result, a space inside or in the vicinity of the bearing box becomes narrow, making it difficult to easily install an expansion member (hydraulic jack, etc.) during maintenance, which may reduce the maintenance performance.

In view of the above, an object of at least one embodiment of the present invention is to provide a maintenance method for a steam turbine and a steam turbine whereby it is possible to suppress the reduction in maintenance performance due to the shortening of the steam turbine.

Solution to the Problems

A maintenance method for a steam turbine according to at least one embodiment of the present invention is a maintenance method for a steam turbine including a rotor, a casing for accommodating the rotor, and a bearing box for accommodating a bearing which supports the rotor, comprising: a step of installing an expansion-and-contraction member below the rotor by using an upward facing flat surface disposed between the casing and the bearing box in an axial direction; and a step of pushing up the rotor upward by the expansion-and-contraction member.

Further, a steam turbine according to at least one embodiment of the present invention comprises: a rotor; a casing for accommodating the rotor; a bearing box for accommodating a bearing which supports the rotor; and a protruding portion protruding from the bearing box toward the casing in an axial direction and capable of being fitted into the casing below the rotor. The protruding portion has an upper surface which is an upward facing flat surface disposed between the casing and the bearing box in the axial direction below the rotor.

Advantageous Effects

At least one embodiment of the present invention provides a maintenance method for a steam turbine and a steam turbine whereby it is possible to suppress the reduction in maintenance performance due to the shortening of the steam turbine.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

(Configuration of Steam Turbine)

Figure 1:
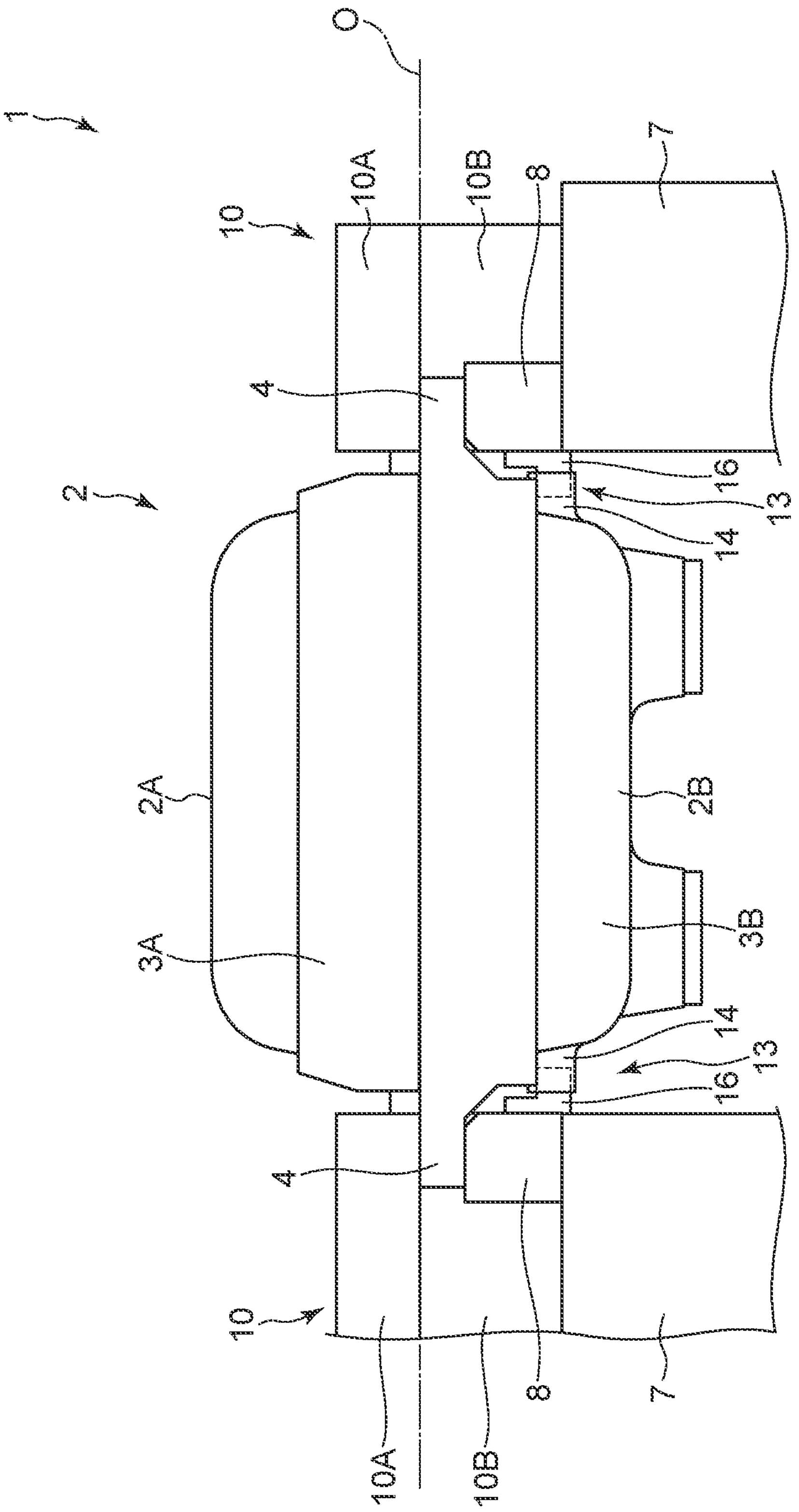
FIG. 1 is a schematic diagram of a steam turbine according to an embodiment.
Figure 2:
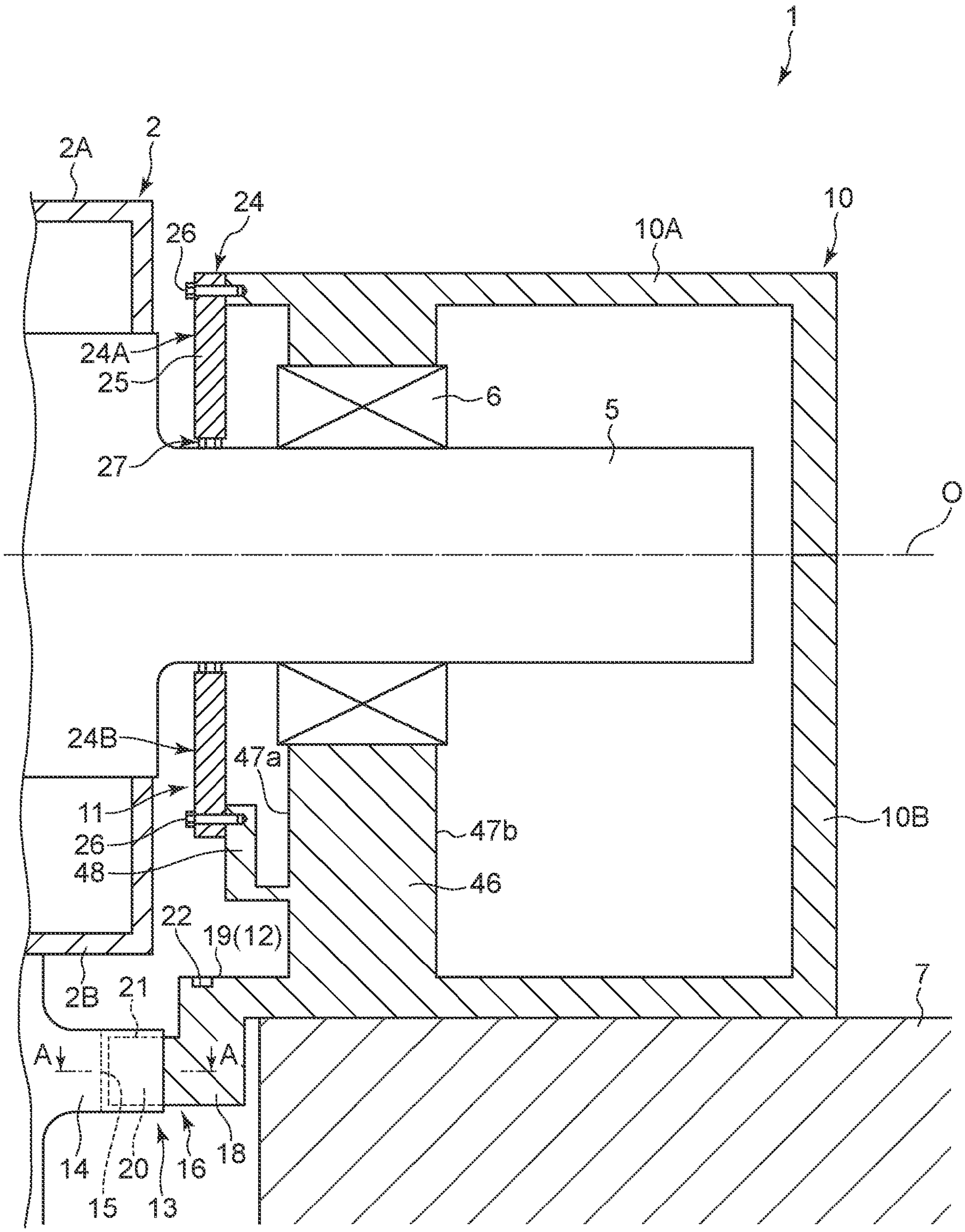
FIG. 2 is a schematic cross-sectional view of the steam turbine shown in FIG. 1 including a bearing box.
Figure 3A:
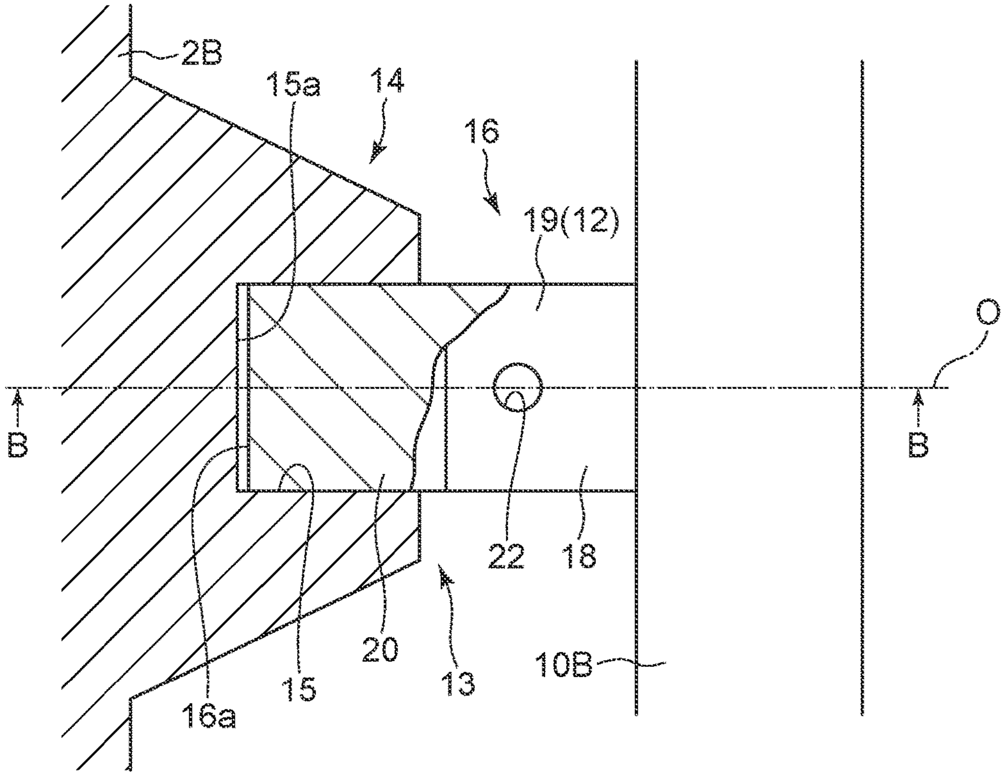
FIG. 3A is a partial cross-sectional view of the steam turbine including cross-section A-A of FIG. 2.
Figure 3B:
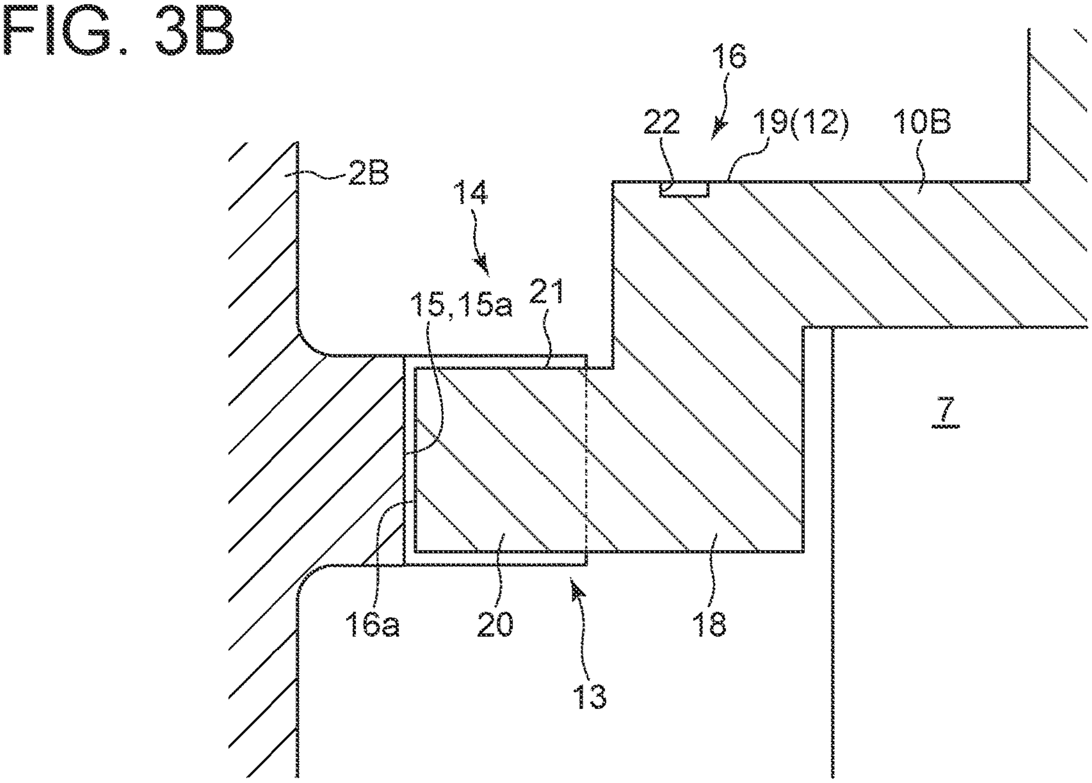
FIG. 3B is a cross-sectional view taken along line B-B of FIG. 3A.

FIG. 1 is a schematic diagram of a steam turbine according to an embodiment. FIG. 2 is a schematic cross-sectional view of the steam turbine shown in FIG. 1 including a bearing box. FIG. 3A is a partial cross-sectional view of the steam turbine including cross-section A-A of FIG. 2. FIG. 3B is a cross-sectional view taken along line B-B of FIG. 3A.

As shown in FIGS. 1 and 2, the steam turbine 1 according to an embodiment includes a rotor 5 (see FIG. 2) which is rotatable around the central axis O, a casing 2 disposed so as to cover the rotor 5, a bearing 6 (see FIG. 2) which supports the rotor 5 in a rotatable manner, and a bearing box 10 for accommodating the bearing 6. As shown in FIG. 2, the rotor 5 is disposed so as to penetrate the casing 2 and the bearing box 10. A steam passage is provided in the casing 2. The casing 2 accommodates a plurality of blades (not shown) disposed in the steam passage around the rotor 5.

The casing 2 includes a casing upper half part 2A located on the upper side and a casing lower half part 2B located on the lower side in the upper-lower direction (vertical direction), and an upper flange portion 3A provided on the casing upper half part 2A and a lower flange portion 3B provided on the casing lower half part 2B are secured by a bolt (not shown).

The casing 2 is supported by a casing support portion 8 fixed to a base 7. In the illustrated embodiment, the casing lower half part 2B has curved leg portions 4 protruding in the axial direction (the direction of the central axis O of the rotor), and is supported by the casing support portion 8 via the curved leg portions 4. In the casing 2 shown in FIG. 1, the casing lower half part 2B has a pair of curved leg portions 4 on both sides of the central axis O in plan view at each of the two axial end portions, i.e., four curved leg portions 4 in total.

The bearing box 10 includes a bearing box upper half part 10A located on the upper side and a bearing box lower half part 10B located on the lower side in the upper-lower direction, and the bearing box upper half part 10A and the bearing box lower half part 10B are secured by a bolt (not shown) or the like. The bearing box 10 is installed on the base 7. The bearing box 10 may include a bearing stand portion 46 for supporting the bearing 6 and a seal mounting portion 48 to which a seal member 24, which will be described later, is mounted. The bearing stand portion 46 is disposed so as to at least partially overlap the bearing 6 in the axial direction, and has axial end surfaces 47*a* and 47*b*.

As shown in FIG. 2, a seal member 24 is disposed in a penetration portion 11 of the bearing box 10 through which the rotor 5 penetrates to suppress leakage of a fluid (e.g., oil) from the inside of the bearing box 10 to the external space. In an embodiment, the seal member 24 includes a ring member 25 disposed so as to surround the rotor 5 on the radially outer side of the rotor 5, and a fin portion 27 disposed in a gap between the rotor 5 and the ring member 25 in the radial direction. The ring member 25 has a plurality of bolt holes extending along the axial direction, and the seal member 24 is mounted to the seal mounting portion 48 of the bearing box 10 by screwing bolts 26 into the bolt holes. The seal mounting portion 48 may be disposed so as to protrude from the casing-side axial end surface 47*a* of the axial end surfaces 47*a*, 47*b* of the bearing stand portion 46 toward the casing 2 in the axial direction. Further, the seal mounting portion 48 may be adjacent to the seal member 24 in the axial direction.

The seal member 24 may have a structure that can be divided into an upper half part and a lower half part. The seal member 24 shown in FIG. 2 includes a seal member upper half part 24A located on the upper side and a seal member lower half part 24B located on the lower side in the upper-lower direction, and has a structure that can be divided into the upper half part and the lower half part.

As shown in FIGS. 1 and 2, the steam turbine 1 includes a protruding portion 16 protruding from the bearing box 10 toward the casing 2 in the axial direction and capable of being fitted into the casing 2 below the rotor 5. The protruding portion 16 is disposed so as to protrude in the axial direction from a portion where the bearing box 10 and the base 7 to which the bearing box 10 is fixed face each other in the upper-lower direction. In the illustrated embodiment, the protruding portion 16 is disposed so as to protrude in the axial direction from the bearing box lower half part 10B.

Further, the casing 2 of the steam turbine 1 has a groove portion 15 capable of engaging with the protruding portion 16 below the rotor. In the illustrated embodiment, the groove portion 15 is provided in a receiving portion 14 disposed so as to protrude from the casing lower half part 2B toward the bearing box 10 in the axial direction. By fitting the protruding portion 16 to the groove portion 15, a fitting portion 13 is formed.

As shown in FIGS. 3A and 3B, when the protruding portion 16 of the bearing box 10 and the groove portion 15 of the casing 2 are fitted together, a gap is formed between a tip surface 16*a* of the protruding portion 16 and a bottom surface 15*a* of the groove portion 15, which allows the casing 2 to move relative to the bearing box 10 in the axial direction due to thermal expansion or the like. Further, as shown in FIG. 3A, in plan view, there is almost no gap in the direction perpendicular to the central axis of the rotor 5 between the protruding portion 16 and the groove portion 15, which restricts movement of the casing 2 relative to the bearing box 10 in this direction. Therefore, by fitting the protruding portion 16 to the groove portion 15, it is possible to align the centers of the bearing box 10 and the casing 2 while allowing movement of the casing 2 relative to the bearing box 10 in the axial direction. The straight line O' in FIG. 3A indicates the position of the central axis O of the rotor 5 in plan view.

In the exemplary embodiment shown in FIGS. 2 to 3B, the protruding portion 16 protruding from the bearing box 10 in the axial direction includes a base portion 18 connected to the bearing box 10, and a tip portion 20 disposed closer to the casing 2 than the base portion 18. The base portion 18 has an upper surface 19 disposed above an upper surface 21 of the tip portion 20. The tip portion 20 is at least partially disposed below the upper surface of the base 7 on which the bearing box 10 is installed.

When the bearing box 10 is shortened in the axial direction with the shortening of the steam turbine 1, the bearing box 10 may also be shortened in the upper-lower direction to prevent the bearing box 10 from overturning. In this case, it is necessary to provide the upper surface of the base 7 at a higher position than conventional. On the other hand, since the structure of the casing 2 remains unchanged, the position of the groove portion 15 of the casing 2, which engages with the protruding portion 16 of the bearing box 10, is unchanged, so the fitting position between the groove portion 15 and the protruding portion 16 is unchanged. Accordingly, the protruding portion 16 is fitted to the groove portion 15 at a position lower than the mounting position of the bearing box 10 to the base 7. Thus, in the steam turbine 1 that is shortened in the axial direction, as described above, in order to allow the protruding portion 16 and the groove portion 15 to be appropriately fitted together, the protruding portion 16 has the base portion 18 connected to the casing 2 and the tip portion 20 at least partially disposed below the upper surface of the base 7. Further, the tip portion 20 is at least partially disposed below the bottom surface of the bearing box 10. Here, the base 7 refers to the foundation on which the bearing box 10 is installed, and the bearing box 10 is installed on the upper surface of the base 7.

The steam turbine 1 has an upward facing flat surface 12 disposed between the casing 2 and the bearing box 10 below the rotor 5. As described below, during maintenance of the steam turbine 1, an expansion-and-contraction member (e.g., hydraulic jack) for pushing up the rotor 5 is installed by using the flat surface 12. That is, the flat surface 12 is configured such that the expansion-and-contraction member can be placed thereon.

In some embodiments, the flat surface 12 may be formed by the upper surface of the protruding portion 16 protruding from the bearing box 10 toward the casing 2 in the axial direction below the rotor 5. In the exemplary embodiment shown in FIGS. 2 and 3, the upper surface 19 of the base portion 18 of the protruding portion 16 functions as the flat surface 12.

In the protruding portion 16, the vertical dimension of the portion with the flat surface 12 of the base portion 18 is larger than the vertical dimension of the tip portion 20. Further, the vertical dimension of the portion with the flat surface 12 of the base portion 18 is larger than the vertical dimension of the portion closer to the bearing box 10 than the portion with the flat surface 12 of the base portion 18.

The flat surface 12 may be located below the seal member 24 disposed in the bearing box 10, as shown in FIG. 2, for example. In this case, during maintenance, the space formed by removing the seal member 24 can be used to install the expansion-and-contraction member.

Further, for example as shown in FIG. 2, the flat surface 12 may be disposed closer to the bearing box 10 in the axial direction than the fitting portion 13 of the protruding portion 16 to the groove portion 15 of the receiving portion 14 (casing 2). In this case, it becomes easier to avoid interference between the casing 10 and the expansion-and-contraction member placed on the flat surface 12 during maintenance.

Further, for example as shown in FIG. 2, the seal mounting portion 48 protruding from the bearing stand portion 46 of the bearing box 10 in the axial direction may be disposed between the rotor 5 and the flat surface 12 in the vertical direction (upper-lower direction), and may be adjacent to the seal member 24 in the axial direction. In this case, since a space is formed in the radially outer region of the seal member 24 and the seal mounting portion 48, when the seal member 24 is removed during maintenance, this space can be used to easily install the expansion-and-contraction member.

Further, the flat surface 12 may have a recessed portion or a projecting portion capable of engaging with a jig (described later) on which the expansion-and-contraction member can be placed. In this case, the jig can be appropriately installed on the flat surface 12 in a relatively narrow space. In the exemplary embodiment shown in FIGS. 2 to 3B, the upper surface 19 of the base portion 18 of the protruding portion 16 as the flat surface 12 has a recessed portion 22 that is recessed downward. This recessed portion can engage with a projecting portion provided in the jig.

(Maintenance Method for Steam Turbine)

Figure 4:
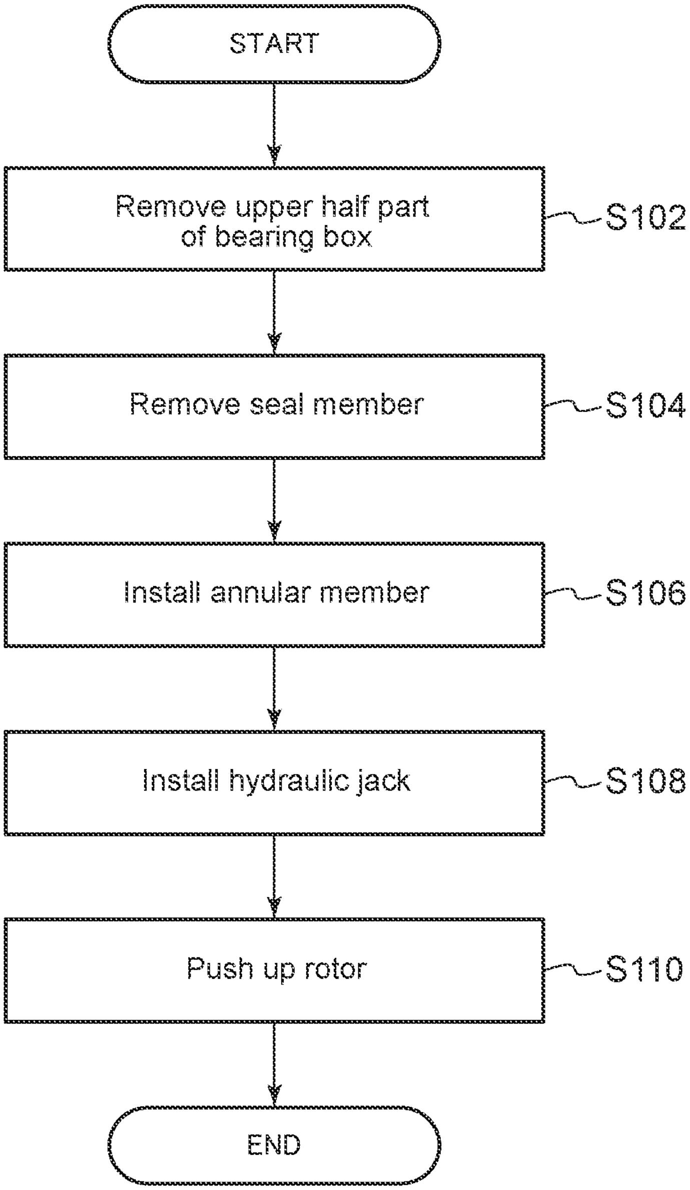
FIG. 4 is a flowchart of a maintenance method according to an embodiment.
Figure 5:
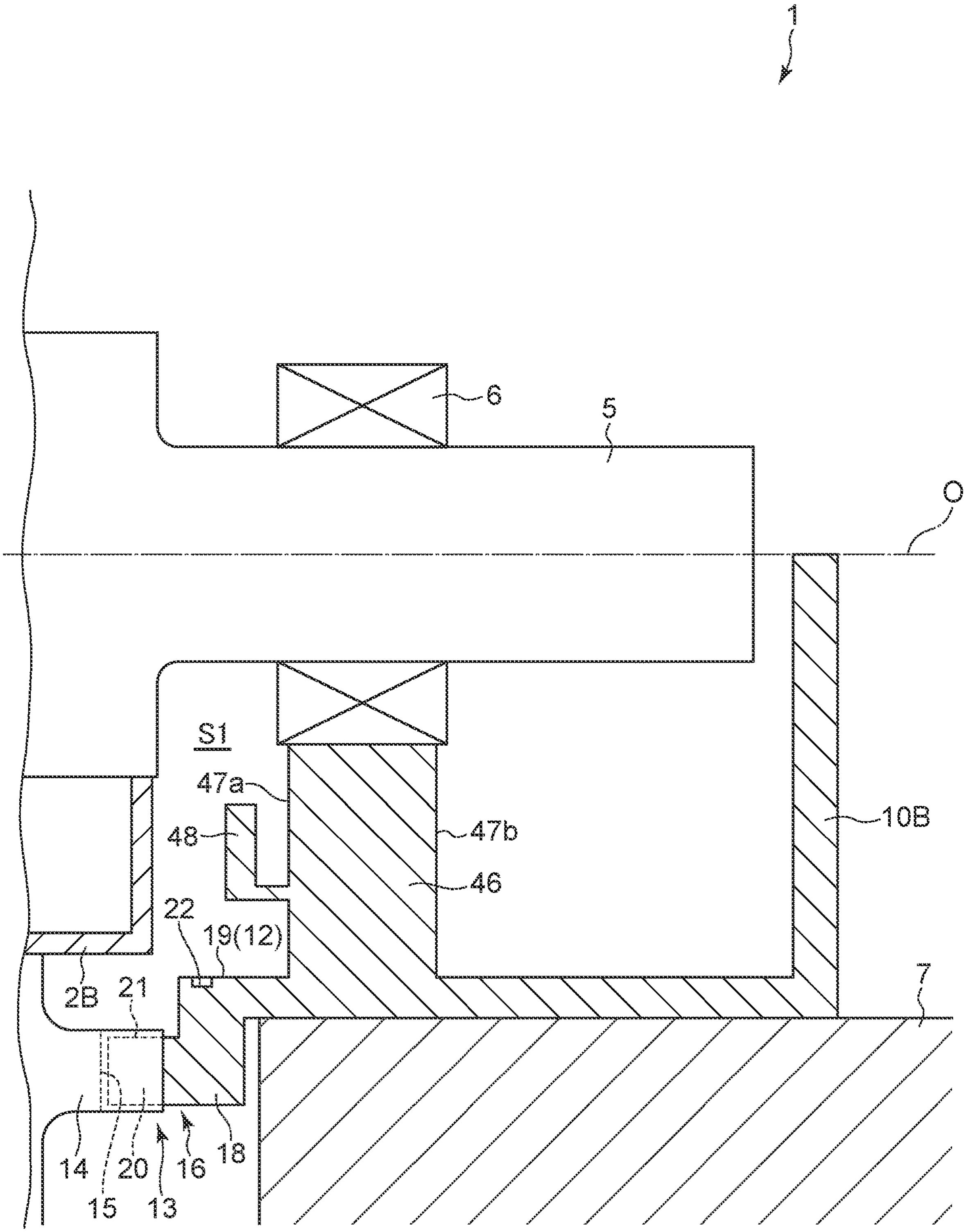
FIG. 5 is a diagram for describing the process of the maintenance method according to an embodiment.
Figure 6:
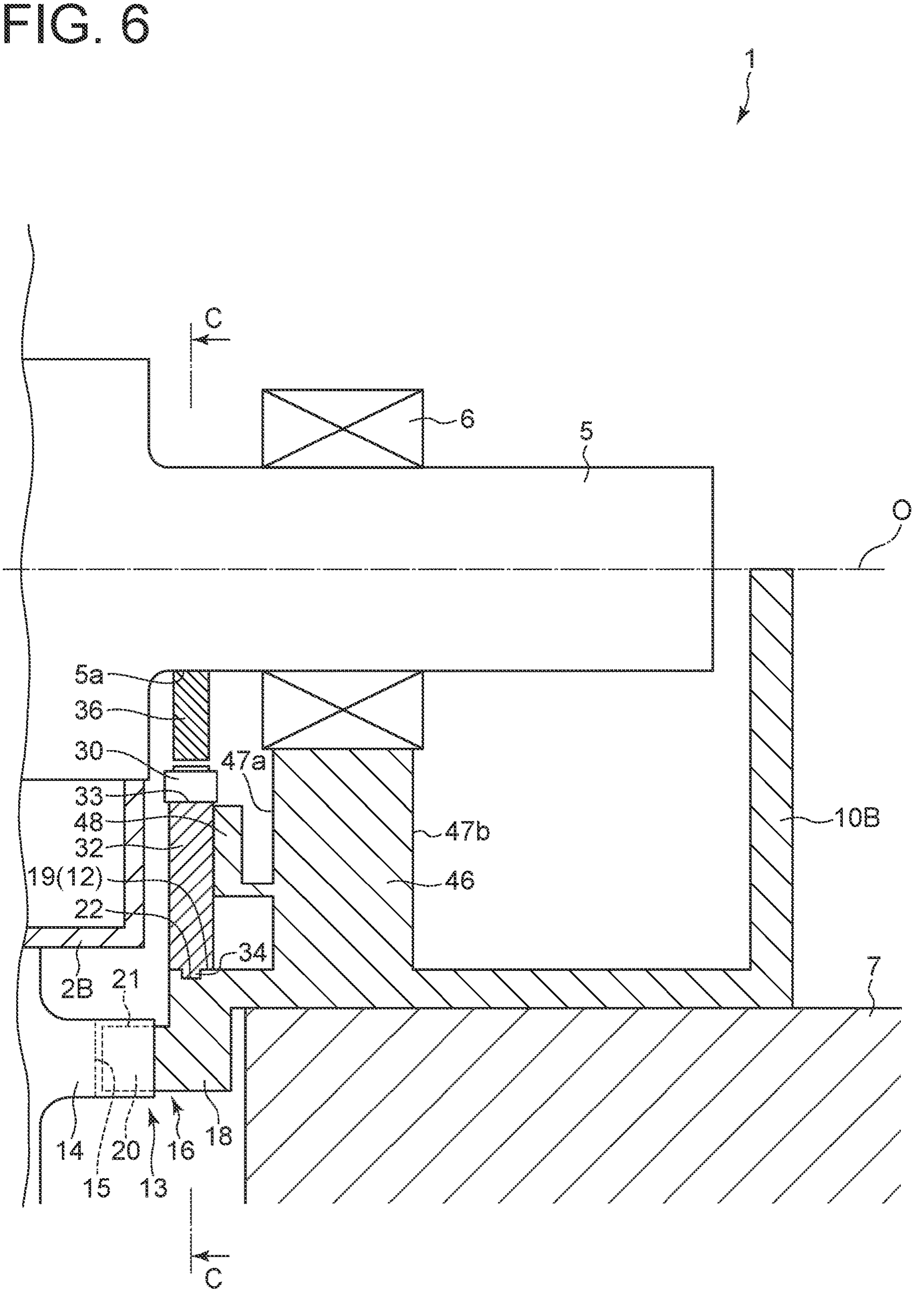
FIG. 6 is a diagram for describing the process of the maintenance method according to an embodiment.
Figure 7:
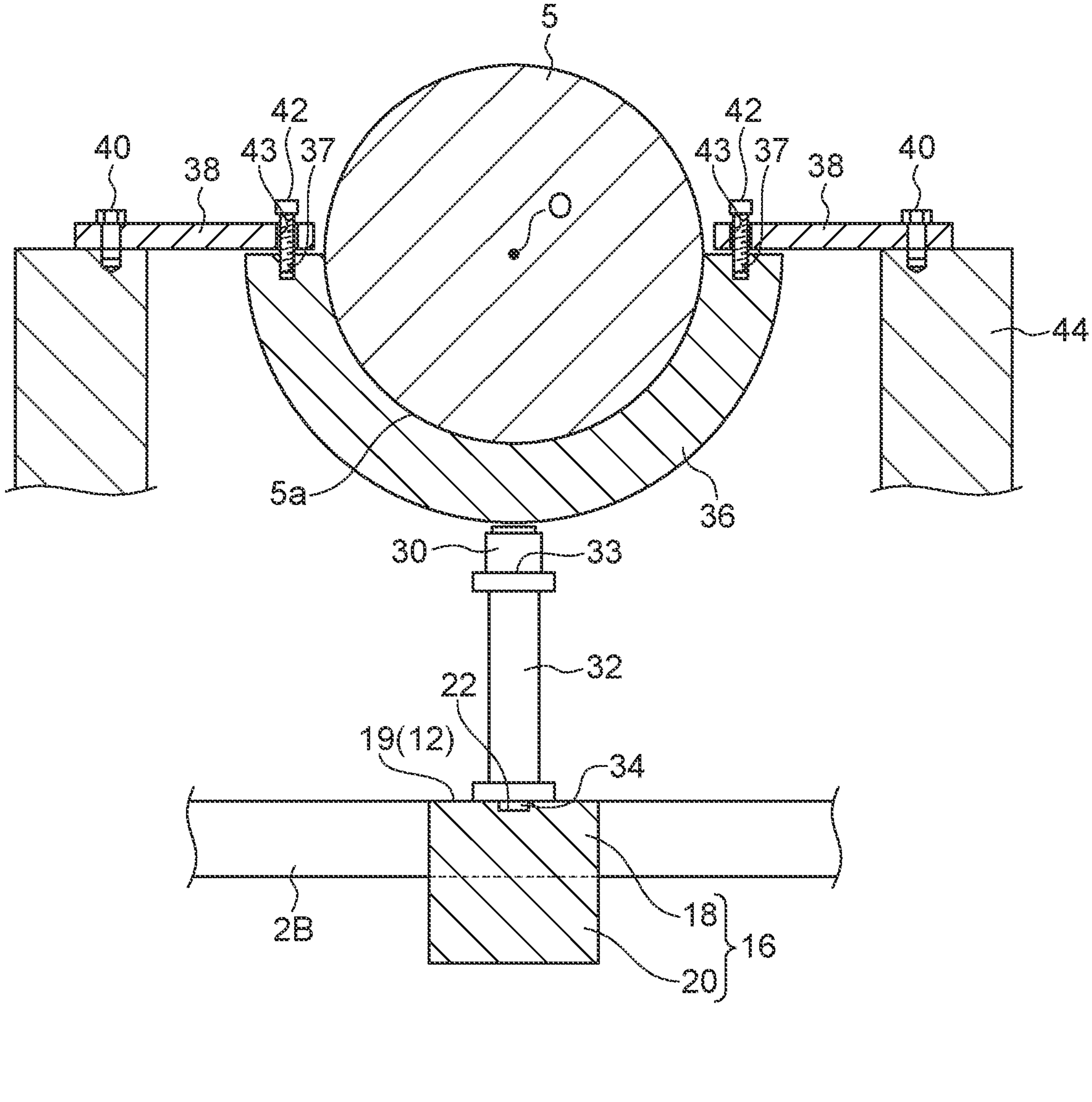
FIG. 7 is a cross-sectional view taken along line C-C of FIG. 6.

A maintenance method for a steam turbine according to some embodiments will be described in accordance with the flowchart shown in FIG. 4. Here, the above-described steam turbine 1 will be described as an example of the maintenance target. FIG. 4 is a flowchart of a maintenance method according to an embodiment. FIGS. 5 and 6 are each a diagram for describing the process of the maintenance method according to an embodiment, and are a schematic cross-sectional view of the steam turbine including the bearing box similar to FIG. 2. FIG. 7 is a cross-sectional view taken along line C-C of FIG. 6.

In the maintenance method according to an embodiment, first, the bearing box upper half part 10A (see FIG. 2) is removed by removing the bolt securing the bearing box upper half part 10A and the bearing box lower half part 10B (step S102). Further, the seal member 24 is removed by removing the bolt 26 (step S104). Further, the casing upper half part 2A is removed. As a result, as shown in FIG. 5, the upper half of the steam turbine 1 is opened, and the rotor 5 can be lifted.

Step S102 and step S104 may be performed sequentially or at least partially simultaneously. For example, the seal member upper half part 24A may be removed at the same time as the bearing box upper half part 10A is removed, and then the seal member lower half part 24B may be removed.

Then, as shown in FIGS. 6 and 7, an annular member 36 facing the lower region of the outer peripheral surface 5*a* of the rotor 5 is installed (step S106). When the rotor 5 is pushed up in the subsequent step, applying the push-up force from the expansion-and-contraction member to the rotor 5 via the annular member 36 makes it easier to push up the rotor 5 appropriately. In step S106, the annular member 36 may be installed such that at least a portion of the annular member 36 is disposed in the space S1 (see FIG. 5) formed by removing the seal member 24 (see FIG. 2) in step S104. If the rotor 5 is lifted without the annular member 36, the execution of step S106 may be skipped.

Then, as shown in FIGS. 6 and 7, a hydraulic jack (expansion-and-contraction member) 30 is installed below the rotor 5 by using the upward facing flat surface 12 disposed between the casing 2 and the bearing box 10 in the axial direction (step S108).

In step S108, the hydraulic jack 30 may be installed such that at least a portion of the hydraulic jack 30 is disposed in the space S1 (see FIG. 5) formed by removing the seal member 24 (see FIG. 2) in step S104.

As shown in FIGS. 6 and 7, the flat surface 12 may be the upper surface 19 of the base portion 18 of the protruding portion 16 protruding from the bearing box 10 toward the casing 2 in the axial direction. That is, in step S108, the hydraulic jack 30 may be installed by using the upper surface 19 of the base portion 18 which is the flat surface 12.

In step S108, for example, as shown in FIGS. 6 and 7, a jig 32 on which the hydraulic jack 30 can be placed may be installed on the flat surface 12, and the hydraulic jack 30 may be installed on the upper surface 33 of the jig 32. The jig 32 is configured to have an upper surface 33 at a height suitable for mounting the hydraulic jack 30.

As shown in FIGS. 6 and 7, the flat surface 12 has a recessed portion 22 that is recessed downward (or a projecting portion that protrudes upward), and the lower end portion of the jig 32 has a projecting portion 34 that protrudes downward (or a recessed portion that is recessed upward). The jig 32 may be installed on the flat surface 12 by engaging the recessed portion 22 (or the projecting portion) of the flat surface 12 with the projecting portion 34 (or the recessed portion) of the jig 32.

Although not shown, in step S108, the hydraulic jack 30 may be installed on the flat surface 12 (e.g., the upper surface 19 of the base portion 18 of the protruding portion 16).

Then, the push-up force of the hydraulic jack 30 is applied to the rotor by the hydraulic jack 30 installed in step S108 to push up the rotor 5 (step S110). If the annular member 36 has been installed in step S106, the push-up force from the expansion-and-contraction member is applied to the rotor 5 via the annular member 36.

With the method according to the above-described embodiment, since the hydraulic jack 30 (expansion-and-contraction member) is installed below the rotor 5 by using the flat surface 12 disposed between the casing 2 and the bearing box 10 in the axial direction, for example even if there is not sufficient installation space in the bearing box 10 or the like due to the shortening of the turbine, the hydraulic jack 30 can be easily installed by using the flat surface 12 during maintenance. Thus, even if the steam turbine 1 is shortened in the axial direction, maintenance can be efficiently performed, and the reduction in maintenance performance due to the shortening of the steam turbine 1 can be suppressed.

In step S110, the hydraulic jack 30 and the jack bolt 42 (see FIG. 7) may be used together to lift the rotor 5 upward. In an embodiment, as shown in FIG. 7, an arm 38 having a through hole 43 is attached to a member 44 (e.g., bearing box lower half part 10B) installed or fixed to the base 7 by, for example, a bolt 40. The tip portion of the jack bolt 42 inserted in the through hole 43 is screwed into a screw hole

37 provided in the upper surface of the annular member 36. By screwing the jack bolt 42 into the screw hole 37, the rotor 5 and the annular member 36 can be jacked up with respect to the casing lower half part 2B (casing 2).

By using the hydraulic jack 30 and the jack bolt 42 together in this manner, a larger force can be applied to the rotor 5, and the rotor 5 can be lifted higher. Further, by pushing up the rotor 5 with the hydraulic jack 30, the height of the rotor 5 can be adjusted with high accuracy.

In the above-described embodiments, the case where the upper surface of the protruding portion 16 protruding from the bearing box 10 in the axial direction is used as the flat surface 12 for installation of the hydraulic jack 30 (expansion-and-contraction member) has been described. However, in other embodiments, for example, an upward facing surface of a beam disposed between the casing 2 and the bearing box 10 in the axial direction may be used as the flat surface 12 for installation of the hydraulic jack 30. The beam may be disposed so as to extend along the axial direction or along the direction perpendicular to the axial direction in plan view.

The contents described in the above embodiments would be understood as follows, for instance.

(1) A maintenance method for a steam turbine according to at least one embodiment of the present invention is a maintenance method for a steam turbine (1) including a rotor (5), a casing (2) for accommodating the rotor, and a bearing box (10) for accommodating a bearing (6) which supports the rotor, comprising: a step (e.g., the above-described step S108) of installing an expansion-and-contraction member (e.g., the above-described hydraulic jack 30) below the rotor by using an upward facing flat surface (12) disposed between the casing and the bearing box in an axial direction; and a step (e.g., the above-described step S110) of pushing up the rotor upward by the expansion-and-contraction member.

With the above method (1), since the expansion-and-contraction member is installed below the rotor by using the flat surface disposed between the casing and the bearing box in the axial direction, for example even if there is not sufficient installation space in the bearing box or the like due to the shortening of the turbine, the expansion-and-contraction member can be easily installed by using the flat surface during maintenance. Thus, with the above configuration (1), even if the steam turbine is shortened in the axial direction, maintenance can be efficiently performed, and the reduction in maintenance performance due to the shortening of the steam turbine can be suppressed.

(2) In some embodiments, in the above method (1), the maintenance method comprises a step (e.g., the above-described step S104) of removing, from the bearing box, a seal member disposed in a penetration portion of the bearing box through which the rotor penetrates. The step of installing the expansion-and-contraction member includes installing the expansion-and-contraction member such that at least a portion of the expansion-and-contraction member is disposed in a space (S1) formed by removing the seal member.

During maintenance of a bearing of a steam turbine, a seal member provided in a bearing box is usually removed. In this regard, with the above method (2), since the expansion-and-contraction member is installed by using the space formed by removing the seal member disposed in the bearing box, the expansion-and-contraction member can be easily installed without special work for providing an installation space during maintenance. Thus, it is possible to suppress the reduction in maintenance performance due to the shortening of the steam turbine.

(3) In some embodiments, in the above method (1) or (2), the pushing-up step includes applying a push-up force from the expansion-and-contraction member to the rotor via an annular member (36) disposed so as to face a lower region of an outer peripheral surface (5*a*) of the rotor.

With the above method (3), since the push-up force from the expansion-and-contraction member is applied to the rotor via the annular member disposed so as to face the lower region of the outer peripheral surface of the rotor, the rotor can be pushed up by appropriately applying the push-up force from the expansion-and-contraction member to the rotor.

(4) In some embodiments, in any one of the above methods (1) to (3), the maintenance method comprises a step of jacking up the rotor and the annular member with respect to the casing by using a jack bolt (42) inserted in a through hole (43) provided in an arm (38) attached to a base (7) or to a member (44) installed or fixed to a base.

With the above method (4), since the expansion-and-contraction member and the jack bolt are used together for pushing up the rotor, the rotor can be pushed up more reliably.

(5) In some embodiments, in any one of the above methods (1) to (4), the steam turbine includes a protruding portion (16) protruding from the bearing box toward the casing in the axial direction and capable of being fitted into the casing below the rotor, and the flat surface includes an upper surface of the protruding portion (e.g., the above-described upper surface 19 of the base portion 18 of the protruding portion 16).

Some steam turbines are provided with a protruding portion protruding in the axial direction and capable of being fitted into the casing for alignment of the casing and the bearing box. In this regard, with the above method (5), the expansion-and-contraction member can be easily installed during maintenance by using the upper surface of the protruding portion protruding from the bearing box toward the casing in the axial direction and capable of being fitted into the casing below the rotor. Thus, it is possible to suppress the reduction in maintenance performance due to the shortening of the steam turbine.

(6) In some embodiments, in the above method (5), the step of installing the expansion-and-contraction member includes installing the expansion-and-contraction member on the upper surface of the protruding portion.

With the above method (6), since the expansion-and-contraction member is installed on the upper surface of the protruding portion, the expansion-and-contraction member can be easily installed during maintenance. Thus, it is possible to suppress the reduction in maintenance performance due to the shortening of the steam turbine.

(7) In some embodiments, in the above method (5), the maintenance method comprises a step of installing a jig (32) on which the expansion-and-contraction member can be placed on the upper surface of the protruding portion. The step of installing the expansion-and-contraction member includes installing the expansion-and-contraction member on an upper surface (33) of the jig.

With the above method (7), since the expansion-and-contraction member is installed on the upper surface of the jig installed on the upper surface of the protruding portion, the expansion-and-contraction member can be easily installed during maintenance. Thus, it is possible to suppress the reduction in maintenance performance due to the shortening of the steam turbine.

(8) In some embodiments, in the above method (7), the step of installing the jig includes engaging a projecting portion or a recessed portion (e.g., the above-described projecting portion 34) disposed in a lower portion of the jig with a recessed portion or a projecting portion (e.g., the above-described recessed portion 22) disposed in the upper surface of the protruding portion.

With the above method (8), by engaging the projecting portion or the recessed portion disposed in the lower portion of the jig with the recessed portion or the projecting portion disposed in the upper surface of the protruding portion, even if the installation space for the jig is narrow, the jig can be installed easily and reliably. As a result, the expansion-and-contraction member can be easily installed during maintenance. Thus, it is possible to suppress the reduction in maintenance performance due to the shortening of the steam turbine.

(9) A steam turbine (1) according to at least one embodiment of the present invention comprises: a rotor (5); a casing (2) for accommodating the rotor; a bearing box (10) for accommodating a bearing which supports the rotor; and a protruding portion (16) protruding from the bearing box toward the casing in an axial direction and capable of being fitted into the casing below the rotor. The protruding portion has an upper surface (e.g., the above-described upper surface 19 of the base portion 18 of the protruding portion 16) which is an upward facing flat surface (12) disposed between the casing and the bearing box in the axial direction below the rotor. The flat surface is configured such that an expansion-and-contraction member (e.g., the above-described hydraulic jack) for pushing up the rotor can be placed thereon.

Some steam turbines are provided with a protruding portion protruding in the axial direction and capable of being fitted into the casing for alignment of the casing and the bearing box. In this regard, with the above configuration (9), the expansion-and-contraction member can be easily installed during maintenance by using the upper surface of the protruding portion protruding from the bearing box toward the casing in the axial direction and capable of being fitted into the casing below the rotor. Thus, with the above configuration (9), even if the steam turbine is shortened in the axial direction, maintenance can be efficiently performed, and the reduction in maintenance performance due to the shortening of the steam turbine can be suppressed.

(10) In some embodiments, in the above configuration (9), the steam turbine comprises a seal member (24) disposed in a penetration portion of the bearing box through which the rotor penetrates. The upper surface of the protruding portion is disposed below the seal member.

During maintenance of a bearing of a steam turbine, a seal member provided in a bearing box is usually removed. In this regard, with the above configuration (10), since the expansion-and-contraction member can be installed by using the space formed by removing the seal member disposed in the bearing box, the expansion-and-contraction member can be easily installed without special work for providing an installation space during maintenance. Thus, it is possible to suppress the reduction in maintenance performance due to the shortening of the steam turbine.

(11) In some embodiments, in the above configuration (10), the bearing box includes: a bearing stand portion (46) for supporting the bearing; and a seal mounting portion (48) disposed between the rotor and the flat surface in a vertical direction, protruding from an axial end surface (47*a*) of the bearing stand portion toward the casing in the axial direction, and provided with the seal member.

With the above configuration (11), since the seal member is disposed in the bearing box seal mounting portion, a space is formed in a radially outer region of the seal member. Thus, when the seal member is removed during maintenance, this space can be used to easily install the expansion-and-contraction member. Thus, it is possible to suppress the reduction in maintenance performance due to the shortening of the steam turbine.

(12) In some embodiments, in any one of the above configurations (9) to (11), the upper surface of the protruding portion has a recessed portion or a projecting portion (e.g., the above-described recessed portion 22) capable of engaging with a jig (32) on which an expansion-and-contraction member for pushing up the rotor can be placed.

With the above configuration (12), since the expansion-and-contraction member can be installed on the upper surface of the jig installed on the upper surface of the protruding portion, the expansion-and-contraction member can be easily installed during maintenance. Further, by engaging the recessed portion or projecting portion disposed in the upper surface of the protruding portion with the jig, even if the installation space for the jig is narrow, the jig can be installed easily and reliably. Thus, it is possible to suppress the reduction in maintenance performance due to the shortening of the steam turbine.

(13) In some embodiments, in any one of the above configurations (9) to (12), the protruding portion includes: a base portion (18) connected to the bearing box; and a tip portion (20) disposed closer to the casing than the base portion. The base portion has an upper surface (19) as the flat surface, and the upper surface of the base portion is disposed above an upper surface (21) of the tip portion.

With the above configuration (13), the expansion-and-contraction member can be easily installed during maintenance by using the upper surface of the base portion of the protruding portion connected to the bearing box. Thus, with the above configuration (13), even if the steam turbine is shortened in the axial direction, maintenance can be efficiently performed, and the reduction in maintenance performance due to the shortening of the steam turbine can be suppressed.

(14) In some embodiments, in any one of the above configurations (9) to (13), the flat surface is disposed closer to the bearing box in the axial direction than a fitting portion (13) of the protruding portion to the casing.

With the above configuration (14), since the flat surface on which the expansion-and-contraction member can be placed is disposed closer to the bearing box than the fitting portion of the protruding portion to the casing, it becomes easier to avoid interference between the casing and the expansion-and-contraction member placed on the flat surface during maintenance.

Embodiments of the present invention were described in detail above, but the present invention is not limited thereto, and various amendments and modifications may be implemented.

Further, in the present specification, an expression of relative or absolute arrangement such as "in a direction". "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", and "have" are not intended to be exclusive of other components.

REFERENCE SIGNS LIST

1 Steam turbine
2 Casing
2A Casing upper half part
2B Casing lower half part
3A Upper flange portion
3B Lower flange portion
4 Curved leg portion
5 Rotor
5*a* Outer peripheral surface
6 Bearing
7 Base
8 Casing support portion
10 Bearing box
10A Bearing box upper half part
10B Bearing box lower half part
11 Penetration portion
12 Flat surface
13 Fitting portion
14 Receiving portion
15 Groove portion
15*a* Bottom surface
16 Protruding portion
16*a* Tip surface
18 Base portion
19 Upper surface
20 Tip portion
21 Upper surface
22 Recessed portion
24 Seal member
24A Seal member upper half part
24B Seal member lower half part
25 Ring member
26 Bolt
27 Fin portion
30 Hydraulic jack
32 Jig
33 Upper surface
34 Projecting portion
36 Annular member
37 Screw hole
38 Arm
40 Bolt
42 Jack bolt
43 Through hole
44 Member
46 Bearing stand portion
47*a*, 47*b* Axial end surface
48 Seal mounting portion
O Central axis
S1 Space

The invention claimed is:

1. A steam turbine, comprising:
a turbine rotor;
a casing for accommodating the turbine rotor;
a bearing box for accommodating a bearing which supports the turbine rotor; and
a protruding portion protruding from the bearing box toward the casing in an axial direction and capable of being fitted into the casing below the turbine rotor,
wherein the protruding portion has an upper surface which is an upward facing flat surface disposed between the casing and the bearing box in the axial direction below the turbine rotor, and
wherein the flat surface is configured such that an expansion-and-contraction member for pushing up the turbine rotor can be placed thereon,
wherein the steam turbine comprises a seal member disposed in a penetration portion of the bearing box through which the turbine rotor penetrates, and
wherein the upper surface of the protruding portion is disposed below the seal member.

2. A maintenance method for a steam turbine according to claim 1, the maintenance method comprising:
a step of installing an expansion-and-contraction member below the turbine rotor by using an upward facing flat surface disposed between the casing and the bearing box in an axial direction; and
a step of pushing up the turbine rotor upward by the expansion-and-contraction member.

3. The maintenance method for a steam turbine according to claim 2, comprising a step of removing, from the bearing box, a seal member disposed in a penetration portion of the bearing box through which the turbine rotor penetrates,
wherein the step of installing the expansion-and-contraction member includes installing the expansion-and-contraction member such that at least a portion of the expansion-and-contraction member is disposed in a space formed by removing the seal member.

4. The maintenance method for a steam turbine according to claim 2,
wherein the pushing-up step includes applying a push-up force from the expansion-and-contraction member to the turbine rotor via an annular member disposed so as to face a lower region of an outer peripheral surface of the turbine rotor.

5. The maintenance method for a steam turbine according to claim 2, comprising a step of jacking up the turbine rotor and the annular member with respect to the casing by using a jack bolt inserted in a through hole provided in an arm attached to a base or to a member installed or fixed to a base.

6. The maintenance method for a steam turbine according to claim 2,
wherein the steam turbine includes a protruding portion protruding from the bearing box toward the casing in the axial direction and capable of being fitted into the casing below the turbine rotor, and
wherein the flat surface includes an upper surface of the protruding portion.

7. The maintenance method for a steam turbine according to claim 6,
wherein the step of installing the expansion-and-contraction member includes installing the expansion-and-contraction member on the upper surface of the protruding portion.

8. The maintenance method for a steam turbine according to claim 6, comprising a step of installing a jig on which the expansion-and-contraction member can be placed on the upper surface of the protruding portion,
wherein the step of installing the expansion-and-contraction member includes installing the expansion-and-contraction member on an upper surface of the jig.

9. The maintenance method for a steam turbine according to claim 8, wherein the step of installing the jig includes engaging a projecting portion or a recessed portion disposed in a lower portion of the jig with a recessed portion or a projecting portion disposed in the upper surface of the protruding portion.

10. The steam turbine according to claim 1, wherein the bearing box includes:

a bearing stand portion for supporting the bearing; and a seal mounting portion disposed between the turbine rotor and the flat surface in a vertical direction, protruding from an axial end surface of the bearing stand portion toward the casing in the axial direction, and provided with the seal member.

11. The steam turbine according to claim 1, wherein the upper surface of the protruding portion has a recessed portion or a projecting portion capable of engaging with a jig on which an expansion-and-contraction member for pushing up the turbine rotor can be placed.

12. A steam turbine, comprising:

a turbine rotor;

a casing for accommodating the turbine rotor;

a bearing box for accommodating a bearing which supports the turbine rotor; and a protruding portion protruding from the bearing box toward the casing in an axial direction and capable of being fitted into the casing below the turbine rotor, wherein the protruding portion has an upper surface which is an upward facing flat surface disposed between the casing and the bearing box in the axial direction below the turbine rotor, wherein the flat surface is configured such that an expansion-and-contraction member for pushing up the turbine rotor can be placed thereon, wherein the protruding portion includes:

a base portion connected to the bearing box; and a tip portion disposed closer to the casing than the base portion, wherein the base portion has an upper surface as the flat surface, and wherein the upper surface of the base portion is disposed above an upper surface of the tip portion.

13. A steam turbine, comprising:

a turbine rotor;

a casing for accommodating the turbine rotor;

a bearing box for accommodating a bearing which supports the turbine rotor; and a protruding portion protruding from the bearing box toward the casing in an axial direction and capable of being fitted into the casing below the turbine rotor, wherein the protruding portion has an upper surface which is an upward facing flat surface disposed between the casing and the bearing box in the axial direction below the turbine rotor, wherein the flat surface is configured such that an expansion-and-contraction member for pushing up the turbine rotor can be placed thereon, and wherein the flat surface is disposed closer to the bearing box in the axial direction than a fitting portion formed by fitting the protruding portion to the casing.

* * * * *